(12) United States Patent
Natarajan et al.

(10) Patent No.: US 12,708,939 B2
(45) Date of Patent: Aug. 18, 2026

(54) DIP-COAT BINDER SOLUTIONS COMPRISING A DIP-COAT METALLIC PRECURSOR FOR USE IN ADDITIVE MANUFACTURING

(71) Applicant: General Electric Company, Cincinnati, OH (US)

(72) Inventors: Arunkumar Natarajan, Mason, OH (US); Carlos H. Bonilla, Lebanon, OH (US)

(73) Assignee: General Electric Company, Evendale, OH (US)

( * ) Notice: Subject to any disclaimer, the term of this patent is extended or adjusted under 35 U.S.C. 154(b) by 218 days.

(21) Appl. No.: 18/775,499

(22) Filed: Jul. 17, 2024

(65) Prior Publication Data

US 2024/0367231 A1 Nov. 7, 2024

Related U.S. Application Data

(62) Division of application No. 17/500,390, filed on Oct. 13, 2021, now Pat. No. 12,064,810.

(60) Provisional application No. 63/111,339, filed on Nov. 9, 2020.

(51) Int. Cl.

| | |
|---|---|
| ***B22F 10/16*** | (2021.01) |
| ***B22F 1/103*** | (2022.01) |
| ***B22F 1/105*** | (2022.01) |
| ***B22F 10/62*** | (2021.01) |

(Continued)

(52) U.S. Cl.

CPC .............. *B22F 10/16* (2021.01); *B22F 1/105* (2022.01); *B22F 10/62* (2021.01); *B33Y 10/00* (2014.12); *B33Y 70/00* (2014.12); *B22F 1/103* (2022.01)

(58) Field of Classification Search

CPC .......... B22F 10/16; B22F 1/105; B22F 10/62; B22F 1/103; B22F 2999/00; B22F 1/0545; B22F 1/056; B22F 1/107; B22F 2998/10; B22F 10/14; B33Y 10/00; B33Y 70/00; B33Y 40/20; B33Y 80/00; C08K 3/08;

(Continued)

(56) References Cited

U.S. PATENT DOCUMENTS

| | | | |
|---|---|---|---|
| 5,696,040 | A | 12/1997 | Jarrold et al. |
| 2001/0001640 | A1 | 5/2001 | Miller et al. |

(Continued)

FOREIGN PATENT DOCUMENTS

| | | | |
|---|---|---|---|
| EP | 0354376 | A1 | 2/1990 |
| WO | 03032084 | A2 | 4/2003 |

OTHER PUBLICATIONS

European Extended Search Report for EP Application No. 21203602.4 dated Apr. 8, 2022.

*Primary Examiner* — Rebecca Janssen
(74) *Attorney, Agent, or Firm* — Dinsmore & Shohl LLP

(57) ABSTRACT

A dip-coat binder solution comprises a dip-coat metallic precursor and a dip-coat binder. The dip-coat binder solution has a viscosity greater than or equal to 1 cP and less than or equal to 150 cP. A method of forming a part includes providing a green body part comprising a plurality of layers of print powder and a print binder, dipping the green body part in a dip-coat binder solution, and heating the dip-coated green body part. The dip-coated green body part is heated to form a coated green body part having a metallic precursor coating on an outer surface of the coated green body part. The coated green body part has a strength greater than or equal to 10 MPa.

15 Claims, 6 Drawing Sheets

(51) Int. Cl.
*B33Y 10/00* (2015.01)
*B33Y 70/00* (2020.01)

(58) Field of Classification Search
CPC ..... C08K 5/0091; Y02P 10/25; B29C 64/165; C09D 5/38; C09D 7/61; C09D 7/63
See application file for complete search history.

(56) References Cited

U.S. PATENT DOCUMENTS

2006/0001726 A1 1/2006 Kodas et al.
2021/0362234 A1 11/2021 Jangam et al.

DIP-COAT BINDER SOLUTIONS COMPRISING A DIP-COAT METALLIC PRECURSOR FOR USE IN ADDITIVE MANUFACTURING

CROSS-REFERENCE TO RELATED APPLICATIONS

The present specification is a divisional of U.S. patent application Ser. No. 17/500,390, filed Oct. 13, 2021 and entitled "Dip-coat Binder Solutions Comprising a Dip-coat Metallic Precursor For Use In Additive Manufacturing," which claims the benefit of and priority to U.S. Provisional Application Ser. No. 63/111,339 filed Nov. 9, 2020 and entitled "Dip-coat Binder Solutions Comprising a Dip-coat Metallic Precursor For Use In Additive Manufacturing," the entireties of which are incorporated by reference herein.

FIELD

The present specification relates to additive manufacturing. More specifically, the present specification is directed to binder solutions for use in additive manufacturing.

TECHNICAL BACKGROUND

Additive manufacturing, also known as three-dimensional (3D) printing, is a process in which material is built up layer-by-layer to form an object. Binder jetting is an additive manufacturing technique based on the use of a binder to join particles of a powder to form a 3D object. In particular, the binder is jetted onto successive layers of the powder in a build volume, where layers of the powder and the binder adhere to one another to form a 3D object. In some applications, the as-printed part is suitable for end-use without further processing or manipulation.

In other applications, subsequent processing, such as removal of the binder and sintering of the powder, may be needed to transform the printed 3D part into a finished part. Accordingly, it is desirable for the printed part to have a suitable green strength for handling (e.g., transferring, inspecting, depowdering) and suitable brown strength for minimizing distortion during the debinding/sintering processes. However, binder solutions available for binder jet 3D printing may not provide the brown strength necessary to prevent distortion and damage to the printed part during the post-printing processes.

Accordingly, a need exists for alternative solutions that maintain green strength and provide improved brown strength to the printed part during post-printing processes.

SUMMARY

Various embodiments of dip-coat binder solutions disclosed herein meet these needs by including a metallic precursor that infiltrates the pores of the printed green body part and increases the density of the printed green body part prior to sintering of the print powder, thereby improving the brown strength and overall stiffness of the printed part.

According to a first aspect A1, a method of forming a part, the method comprising: providing a green body part comprising a plurality of layers of print powder and a print binder; dipping the green body part in a dip-coat binder solution to form a dip-coated green body part, the dip-coat binder solution comprising: greater than or equal to 10 wt % and less than or equal to 49 wt % of a dip-coat metallic precursor, based on a total weight of the dip-coat binder solution; and greater than 50 wt % of a thermoplastic polymer, the thermoplastic polymer comprising one or more thermoplastic polymer strands; and heating the dip-coated green body part.

A second aspect A2 includes the method according to the first aspect A1, wherein the dip coat binder solution further comprises greater than or equal to 1 wt % of a solvent.

A third aspect A3 includes the method according to the first aspect A1, wherein heating the dip-coated green body part comprises heating the dip-coated green body part above a first temperature greater than or equal to 50° C. and less than or equal to 200° C. to form a coated green body part having a metallic precursor coating on an outer surface of the coated green body part.

A fourth aspect A4 includes the method according to the third aspect A3, wherein a thickness of the metallic precursor coating on the coated green body part is less than or equal to 2 μm.

A fifth aspect A5 includes the dip-coat binder solution according to the fourth aspect A4, wherein the thickness of the metallic precursor coating on the coated green body part is greater than or equal to 0.01 μm and less than or equal to 0.5 μm.

A sixth aspect A6 includes the dip-coat binder solution according to the fifth aspect A5, wherein the coated green body part has a strength greater than or equal to 10 MPa.

A seventh aspect A7 includes the dip-coat binder solution according to the first aspect A1 or the second aspect A2, wherein heating the dip-coated green body part above the first temperature includes heating the dip-coated green body part in an oxygen-free environment.

An eighth aspect A8 includes the dip-coat binder solution according to the seventh aspect A7, wherein the method further comprises heating the coated green body part above a second temperature greater than or equal to 100° C. and less than or equal to 600° C. to remove at least a portion of the print binder and at least a portion of the dip-coat binder solution to form a coated brown body part having the metallic precursor coating on an outer surface of the dip-coated green body part.

A ninth aspect A9 includes the dip-coat binder solution according to any of the first through eighth aspects A1-A8, wherein the method further comprises heating the coated brown body part above a third temperature greater than or equal to 1000° C. and less than or equal to 1400° C. to sinter the dip-coat metallic precursor and the plurality of layers of print powder to form a consolidated part with a metallic outer surface.

A tenth aspect A10 includes the dip-coat binder solution according to any of the first through ninth aspect A1-A9, wherein the dip-coat binder solution has a viscosity greater than or equal to 1 cP and less than or equal to 150 cP, wherein the viscosity is measured using a rheometer in accordance with ASTM E3116.

An eleventh aspect A11 includes the dip-coat binder solution according to any of the first through tenth aspect A1-A10, wherein the thermoplastic polymer has a first polymer strand, wherein the first polymer strand has an average molecular weight greater than or equal to 7,000 g/mol and less than or equal to 50,000 g/mol.

A twelfth aspect A12 includes the dip-coat binder solution according to any of the eleventh aspect A11, wherein providing the green body part comprising the plurality of layers of print powder further comprises depositing each layer with a thickness greater than or equal to 10 μm and less than or equal to 200 μm.

According to a thirteenth aspect A13, wherein providing the green body part further comprises selectively depositing the print binder according to a pattern to partially coat an outer surface of the plurality of layers of print powder.

A fourteenth aspect A14 includes the coated green body part according to the thirteenth aspect A13, wherein providing the green body part further comprises curing the plurality of layers of print powder and the print binder under a heat source to form the green body part prior to dipping the green body part in the dip-coat binder solution.

A fifteenth aspect A15 includes the coated green body part according to the thirteenth aspect A13 or the fourteenth aspect A14, wherein dipping the green body part in a dip-coat binder solution further comprises iteratively dipping a portion of the green body part into the dip-coat binder solution.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
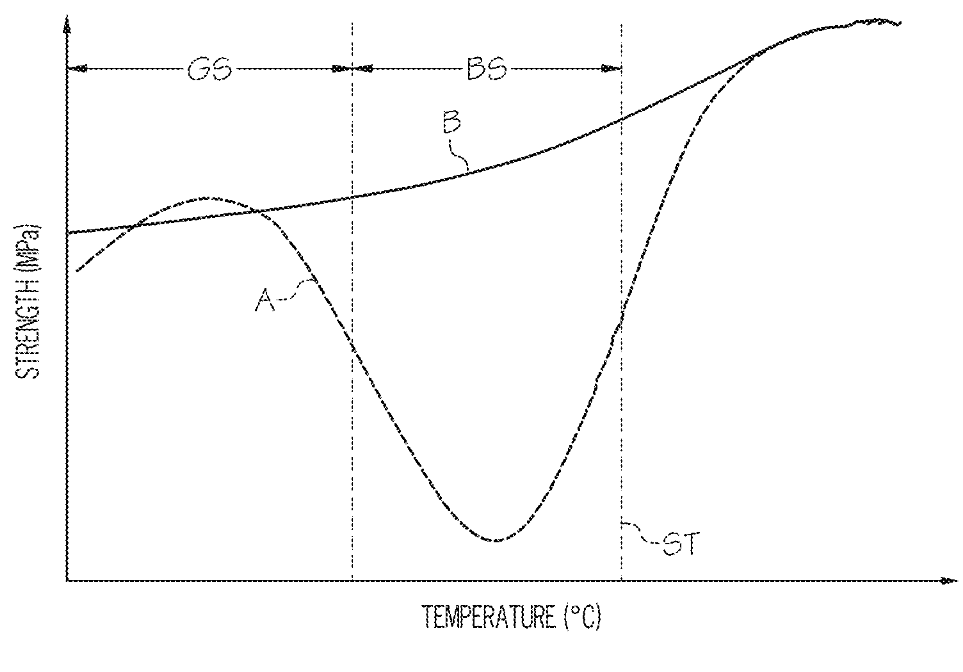
FIG. 1 is a plot showing strength (Y-axis; in megapascals (MPa)) as a function of temperature (X-axis; in ° C.) for a part formed using a conventional print binder solution and a part formed using an example dip-coat binder solution according to one or more embodiments described herein.

Reference will now be made in detail to various embodiments of dip-coat metallic precursor containing dip-coat binder solutions for use in additive manufacturing.

In particular, various embodiments of dip-coat binder solutions comprise greater than or equal to 10 wt % and less than or equal to 49 wt % of a dip-coat metallic precursor. Various embodiments of dip-coat binder solutions will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The phrase "green body part," as used herein, refers to a printed part prior to undergoing heat treatment to remove the print binder.

The phrase "dip-coated green body part," as used herein, refers to a green body part after being dipped in a dip-coat binder solution but prior to undergoing heat treatment to remove the print binder and the organic portion of the dip-coat binder solution.

The phrase "coated green body part," as used herein, refers to a dip-coated green body part after being subjected to a curing heat treatment to transform the dip-coat binder solution into a metallic precursor coating.

The phrase "metallic precursor coating," as used herein, refers to the coating on an outer surface of the coated green body part that results after dipping the green body part in the dip-coat binder solution and subjecting the dip-coated green body part to a curing heat treatment.

The phrase "brown body part," as used herein, refers to a printed part that has undergone a debinding heat treatment to remove at least a portion of the print binder.

The term "debinding," as used herein, refers to heating the coated green body to remove at least portion of the print binder and at least a portion of the dip-coat binder to form a coated brown body part.

The phrase "coated brown body part," as used herein, refers to a coated green body part after being subjected to a debinding heat treatment to remove at least a portion of the print binder and at least a portion of the dip-coat binder.

The term "necked region," as used herein, refers to local deformation of the dip-coat metallic precursor between adjacent particles of the print powder.

The term "sintering," as used herein, refers to heating the coated brown body part to sinter the dip-coat metallic precursor and print powder, thereby forming a consolidated part with a metallic outer surface.

The phrase "metallic outer surface," as used herein, refers to the outer surface of a consolidated part after the coated brown body part is subjected to a sintering heat treatment.

The term "nanoparticle," as used herein, refers to a particle having a diameter greater than or equal to 5 nm and less than or equal to 250 nm.

The term "average diameter," as used herein, refers to the average diameter of the nanoparticles included in the dip-coat binder solution.

The phrase "decomposition temperature," as used herein, refers to the temperature at which localized melting starts to occur within the dip-coat metallic precursor.

The phrase "thermoplastic polymer," as used herein, refers to a polymer having one or more polymer strands having functional groups that may interact with one another via weak non-covalent forces (e.g., interactions, bonds) to link, or otherwise couple, strands of each respective thermoplastic polymer to one another.

The phrase "weak non-covalent forces," as used herein, refers to hydrogen bonding, ionic bonding, Van der Waals forces, and the like having a bond or force strength greater than or equal to 1 kcal/mol and less than or equal to 7 kcal/mol.

The parameter "viscosity" of the binder solution, as discussed herein, is measured using a rheometer in accordance with ASTM E3116.

The parameters "green body strength" and "brown body strength" of the parts, as discussed herein, are measured using a three-point flexural strength test in accordance with ASTM B312-14.

In additive manufacturing processes including binder jetting, a print binder solution is jetted from a printer head onto successive layers of a print powder to join particles of a print powder to form a printed three-dimensional part. As discussed herein, in embodiments, subsequent processing (e.g., debinding and sintering) may be needed to transform the printed three-dimensional part into a consolidated part. Accordingly, it is desirable for the printed part to have a suitable green strength for handling (e.g., transferring, inspecting, depowdering) and suitable brown strength for minimizing distortion during the post-printing processes. This reduces the occurrence of warping or part failure prior to consolidation, thereby improving manufacturing throughput and reducing manufacturing costs.

However, conventional print binder solutions including thermoplastic polymers may not provide the brown strength necessary to prevent distortion and damage to the printed part during the post-printing processes. Specifically, the strength of a green body part is provided by the print binder solution along with some contribution from particle friction and mechanical interlocking of the particles. The strength provided by the print binder solution is due to weak non-covalent forces formed between the thermoplastic polymer strands (e.g., as with polymeric binders). As the green body part is heated to remove the print binder and form a brown body part (e.g., prior to the particles sintering together), the mechanical strength (i.e., the brown strength) of the printed part is dependent on interparticle friction and mechanical interlocking, which is limited in the relatively large, approximately spherical particles commonly used to form the print powder layer (e.g., metal particles). The low brown strength may lead to warping or even mechanical failure of the part.

Accordingly, various embodiments of dip-coat binder solutions disclosed herein include a dip-coat metallic precursor that infiltrates the pores of the green body part generated during 3D printing. This infiltration increases the density of the green body part prior to sintering of the print powder, thereby improving the brown strength and overall stiffness of the printed part. Increasing the density of the article decreases the shrinkage of the printed part during sintering and increases the strength of the printed part, which reduces cracking and distortion.

Referring now to FIG. 1, as shown by curve A, a printed part formed using a conventional print binder solution including a print binder exhibits low brown strength, BS, after the green body part is heated to remove the print binder and prior to sintering of the print powder. In contrast, as shown by curve B, a part formed using a dip-coat binder solution including a dip-coat metallic precursor in accordance with embodiments disclosed herein exhibits improved brown strength, BS, as the green strength, GS, decreases after the green body part is heated to remove the print binder but prior to sintering, ST, the print powder.

In various embodiments, the dip-coat binder solutions described herein comprise a dip-coat metallic precursor and a dip-coat binder. The relatively low viscosity of the dip-coat binder solution enables uniform application of the dip-coat binder solution on the coated portion of the green body part and penetration of the dip-coat binder solution into the coated portion of the green body part, thereby filling the porosity of the green body part. In particular, the dip-coat metallic precursor of the dip-coat binder solution infiltrates the pores of the green body part and the dip-coat binder bonds the dip-coat metallic precursor to both itself (i.e., the dip-coat metallic precursor) and the green body part, which increases the density of, and provides strength to, the green body part. In embodiments, the dip-coated green body part is subjected to a curing heat treatment to transform the dip-coat binder solution into a metallic precursor coating on an outer surface of the green body part, thereby forming a coated green body part having a green strength greater than or equal to 10 MPa.

In embodiments, the coated green body part having the metallic precursor coating is then subjected to a debinding heat treatment to remove at least a portion of the print binder and at least a portion of the dip-coat binder (e.g., debinding) to form a coated brown body part having the metallic precursor coating and having a brown strength greater than or equal to 3 MPa. The dip-coat metallic precursor present in the metallic precursor coating may aid in promoting a rapid, surface-based mass transfer between particles, forming interparticle necked regions more rapidly than would be expected for print powders of conventional binder solutions, even at the relatively low temperatures typically used for debinding. This provides strength to the part even after the print binder is burned out by contacting and bridging the print powder particles prior to sintering of the print powder, thereby improving the strength and stiffness of the printed part overall.

The dip-coat metallic precursor is included in the dip-coat binder solution in amounts such that the viscosity of the dip-coat binder solution is relatively low (e.g., greater than or equal to 1 cP and less than or equal to 150 cP) to enable uniform coating of the dip-coat binder solution on the green body part. Accordingly, in embodiments, the dip-coat binder solution comprises greater than or equal to 10 wt % and less than or equal to 49 wt % of the dip-coat metallic precursor, based on a total weight of the dip-coat binder solution. In embodiments, the amount of dip-coat metallic precursor in the dip-coat binder solution may be greater than or equal to 10 wt %, greater than or equal to 20 wt %, greater than or equal to 30 wt %, or even greater than or equal to 35 wt %, based on a total weight of the dip-coat binder solution. In embodiments, the amount of dip-coat metallic precursor in the dip-coat binder solution less than or equal to 49 wt %, less than or equal to 47 wt %, or even less than or equal to 45 wt %. For example, the amount of dip-coat metallic precursor in the dip-coat binder solution may be greater than or equal to 10 wt % and less than or equal to 49 wt %, greater than or equal to 10 wt % and less than or equal to 47 wt %, greater than or equal to 10 wt % and less than or equal to 45 wt %, greater than or equal to 20 wt % and less than or equal to 49 wt %, greater than or equal to 20 wt % and less than or equal to 47 wt %, greater than or equal to 20 wt % and less than or equal to 45 wt %, greater than or equal to 30 wt % and less than or equal to 49 wt %, greater than or equal to 30 wt % and less than or equal to 47 wt %, greater than or equal to 30 wt % and less than or equal to 45 wt %, greater than or equal to 35 wt % and less than or equal to 49 wt %, greater than or equal to 35 wt % and less than or equal to 47 wt %, or even greater than or equal to 35 wt % and less than or equal to 45 wt %, or any and all sub-ranges formed from any of these endpoints, based on a total weight of the dip-coat binder solution.

In embodiments, the dip-coat metallic precursor comprises one or more of an alkaline earth metal (i.e., an element from Group II of the periodic table), a transition metal (i.e., an element from Groups III-XII of the periodic table), a post-transition metal (i.e., aluminum, gallium, indium, tin, thallium, lead, and bismuth), a metalloid (i.e., boron, silicon, germanium, arsenic, antimony, and tellurium), and a rare earth metal (i.e., scandium, yttrium, and lanthanides). In embodiments, the dip-coat metallic precursor is selected from the group consisting of an alkaline earth metal, a transition metal, a post-transition metal, a metalloid, a rare earth metal, and combinations thereof. In embodiments, the dip-coat metallic precursor is an organometallic compound that is organic solvent soluble, such as, by way of example and not limitation, ferrocene, cobaltocene, iron pentacarbonyl, metal acetylacetonate (e.g., chromium acetylacetonate, molybdenyl acetylacetonate, and tungsten acetlacetonate), a cyclopentadienyl complex (e.g., iron pi-cyclopentadienly complex and cobalt pi-cyclopentadienly complex), a metal alkyl (e.g., iron alkyl and cobalt alkyl), a metal aryl (e.g., iron aryl and cobalt aryl), or combinations thereof. In embodiments, the dip-coat metallic precursor is a salt comprising one or more of carboxylates, nitrates, sulfates, carbonates, formates, chlorides, halides, and derivatives thereof. In embodiments, the dip-coat metallic precursor is a salt, such as a compound selected from the group consisting of carboxylates, nitrates, sulfates, carbonates, formates, chlorides, halides, derivatives thereof, and combinations thereof. Examples of suitable salts that are water/organic solvent soluble include, by way of example and not limitation, nickel chloride, iron chloride, nickel formate, copper chloride, silver nitrate, nickel nitrate, copper nitrate, nickel carbonate, silver carbonate, silver perchlorate, silver halide, nickel sulfate, nickel sulfamate, nickel oxalate dehydrate, ammonium molybdate tetrahydrate, aluminum nitrate, magnesium chloride, barium nitrate, barium chloride, titanium nitrate, and combinations thereof. Other dip-coat metallic precursors are contemplated.

In embodiments, the dip-coat metallic precursor comprises metallic nanoparticles. In embodiments, the metallic nanoparticles comprise nickel (e.g., Ni-IJ70-30 (30 wt % Ni) (Applied Nanotech, Inc., Austin, Texas)), silver (e.g., MicroPE®PG-007-AP (60 wt % Ag) (Paru Technology, Suncheon-si, Jeollanam-do, Korea), chromium, aluminum, cobalt, iron, copper, gold or combinations thereof. However, it should be understood that other metallic nanoparticles, such as titanium nanoparticles, etc., are contemplated and possible. In embodiments, the metallic nanoparticle material in the dip-coat solution depends on the print powder. For example, in embodiments, the metallic nanoparticle material may be the same as or similar to the material of the print powder material. For example, nickel nanoparticles may be used with a print powder comprising stainless steel or nickel-based alloys.

In embodiments, the average diameter of the metallic nanoparticles should be sufficiently high (e.g., greater than or equal to 5 nm) to ensure that the density of the green body part is increased upon infiltration of the pores of the green body part. In embodiments, the average diameter of the metallic nanoparticles should be kept relatively low (e.g., less than or equal to 250 nm) so that the metallic nanoparticles may infiltrate the pores of the green body part. In embodiments, the metallic nanoparticles have an average diameter greater than or equal to 5 nm and less than or equal to 250 nm. In embodiments, the nanoparticles may have an average diameter greater than or equal to 5 nm or even greater than or equal to 25 nm. In embodiments, the nanoparticles may have an average diameter less than or equal to 250 nm, less than or equal to 200 nm, less than or equal to 150 nm, or even less than or equal to 100 nm. For example, the nanoparticles may have an average diameter greater than or equal to 5 nm and less than or equal to 250 nm, greater than or equal to 5 nm and less than or equal to 200 nm, greater than or equal to 5 nm and less than or equal to 150 nm, greater than or equal to 5 nm and less than or equal to 100 nm, greater than or equal to 25 nm and less than or equal to 250 nm, greater than or equal to 25 nm and less than or equal to 200 nm, greater than or equal to 25 nm and less than or equal to 150 nm, or even greater than or equal to 25 nm and less than or equal to 100 nm, or any and all sub-ranges formed from any of these endpoints.

In embodiments, the decomposition temperature of the dip-coat metallic precursor is lower than the sintering temperature of the bulk print powder. As such, during debinding, at least a portion of the dip-coat metallic precursor of the metallic precursor coating decomposes and sinters to form interparticle necked regions of a metallic material. In embodiments, the dip-coat metallic precursor has a decomposition temperature greater than or equal to 300° C. and less than or equal to 600° C. In embodiments, the dip-coat metallic precursor may have a decomposition temperature less than or equal to 600° C., less than or equal to 550° C., less than or equal to 500° C., less than or equal to 450° C., less than or equal to 400° C., or even less than or equal to 350° C. For example, the dip-coat metallic precursor may have a decomposition temperature greater than or equal to 300° C. and less than or equal to 600° C., greater than or equal to 350° C. and less than or equal to 600° C., greater than or equal to 400° C. and less than or equal to 600° C., greater than or equal to 450° C. and less than or equal to 600° C., greater than or equal to 500° C. and less than or equal to 600° C., greater than or equal to 500° C. and less than or equal to 600° C., greater than or equal to 300° C. and less than or equal to 550° C., greater than or equal to 300° C. and less than or equal to 500° C., greater than or equal to 300° C. and less than or equal to 450° C., greater than or equal to 300° C. and less than or equal to 400° C., greater than or equal to 300° C. and less than or equal to 350° C., greater than or equal to 350° C. and less than or equal to 550° C., or even greater than or equal to 400° C. and less than or equal to 500° C., or any and all sub-ranges formed from any of these endpoints.

The dip-coat binder solution further includes a dip-coat binder. The dip-coat binder facilitates bonding the dip-coat metallic precursor to itself (i.e., the dip-coat binder facilitates binding the powders of the dip-coat metallic precursor) and bonding the dip-coat metallic precursor to the green body part, including the pores of the green body part to thereby provide strength to the green body part. The dip-coat binder bonds the dip-coat metallic precursor to itself (i.e., dip-coat metallic precursor) and the green body part without any phase separation or skinning effect (i.e., lack of homogenization) between the dip-coat metallic precursor and green body part. between the dip-coat binder solution.

In embodiments, the dip-coat binder comprises a thermoplastic polymer comprising one or more thermoplastic polymer strands. In embodiments, the dip-coat binder is selected from a class of thermoplastic polymers that generally decompose into small oligomers, carbon dioxide and water without requiring the presence of oxygen. Accordingly, in embodiments, the dip-coat binder may be cleanly and readily removed from the part during debinding and sintering to generate a consolidated part that is substantially free of the dip-coat binder and decomposition products (e.g., char and metal oxides).

In embodiments, the one or more thermoplastic polymer strands includes a first polymer strand. In embodiments, the first polymer strand includes at least a first functional group. Functional groups of the first thermoplastic polymer strand may include, by way of example and not limitation, hydrogen bond donors, hydrogen bond acceptors, negatively charged groups, positively charged groups, or combinations thereof. In embodiments, the first functional group is part of the backbone of the first thermoplastic polymer strand.

In embodiments, the first polymer strand includes one or more polymers such as, but not limited to, polyvinyl alcohol (PVA), polyacryl amide (PAAm), polyacrylic acid (PAA), polyvinyl pyrrolidone (PVP), polymethyl methacrylate (PMMA), polyvinyl methyl ether-maleic anhydride (PVME-MA), polystyrene (PS), derivatives thereof, and combinations thereof. In embodiments, the average molecular weight (Mw or weight average) of the first polymer strand may be adjusted to help achieve the desired dip-coat binder solution viscosity. In embodiments, the average molecular weight of the first polymer strand should be sufficiently high (e.g., greater than or equal to 7,000 g/mol) such that the viscosity of the dip-coat binder solution is high enough to form a coating. In embodiments, the average molecular weight of the first polymer strand should be kept relatively low (e.g., less than or equal to 50,000 g/mol) such that the viscosity of the dip-coat binder solution is low enough to enable uniform application of the dip-coat binder solution on the coated portion of the green body part. In embodiments, the first polymer strand has an average molecular weight (Mw or weight average) greater than 7,000 g/mol to 50,000 g/mol. In embodiments, the first polymer strand may have an average molecular weight greater than or equal to 7,000 g/mol and less than or equal to 50,000 g/mol. For example, the first polymer strand may have an average molecular weight greater than or equal to 7,000 g/mol and less than or equal to 50,000 g/mol, greater than or equal to 7,000 g/mol and less than or equal to 30,000 g/mol, greater than or equal to 7,000 g/mol and less than or equal to 25,000 g/mol, greater than or equal to 7,000 g/mol and less than or equal to 23,000 g/mol, greater than or equal to 9,000 g/mol and less than or equal to 50,000 g/mol, greater than or equal to 9,000 g/mol and less than or equal to 30,000 g/mol, greater than or equal to 9,000 g/mol and less than or equal to 25,000 g/mol, greater than or equal to 9,000 g/mol and less than or equal to 23,000 g/mol, greater than or equal to 13,000 g/mol and less than or equal to 50,000 g/mol, greater than or equal to 13,000 g/mol and less than or equal to 30,000 g/mol, greater than or equal to 13,000 g/mol and less than or equal to 25,000 g/mol, greater than or equal to 13,000 g/mol and less than or equal to 23,000 g/mol, greater than or equal to 23,000 and less than or equal to 50,000 g/mol, greater than or equal to 23,000 g/mol and less than or equal to 30,000 g/mol, greater than or equal to 23,000 g/mol and less than or equal to 25,000 g/mol, greater than or equal to 25,000 g/mol and less than or equal to 50,000 g/mol, greater than or equal to 25,000 g/mol and less than or equal to 30,000 g/mol, or even greater than or equal to 30,000 g/mol and less than or equal to 50,000 g/mol, or any and all sub-ranges formed from any of these endpoints.

In embodiments, the one or more thermoplastic polymer strands further includes a second polymer strand. In embodiments, the second polymer strand includes at least a second functional group different from the first functional group of the first polymer strand. Functional groups of the second thermoplastic polymer strand may include, by way of example and not limitation, hydrogen bond donors, hydrogen bond acceptors, negatively charged groups, positively charged groups, or combinations thereof. In embodiments, the second functional group is part of the backbone of the second thermoplastic polymer strand. In embodiments, the second functional group of the second polymer strand complements the first functional group of the first polymer strand of the dip-coat binder to facilitate non-covalent coupling of the first and second polymer strands. For example, in embodiments, the first function group and the second functional group may be selected from hydroxyl groups, carboxylate groups, amine, thiol, amide, or other suitable functional groups that enable weak, non-covalent coupling of the first and second polymer strands.

In embodiments, the second polymer strand includes one or more polymers such as, but not limited to, polyacrylic acid (PAA), poly methacrylic acid (PmAA), polyacrylamide (PAAm), derivatives thereof, and combinations thereof. In embodiments, the average molecular weight of the second polymer strand may be adjusted to ensure crosslinking with the first polymer strand and increase the green strength. In embodiments, the second polymer strand has an average molecular weight greater than or equal to 100 g/mol and less than or equal to 10,000 g/mol. For example, the second polymer strand may have an average molecular weight greater than or equal to 100 g/mol and less than or equal to 10,000 g/mol, greater than or equal to 100 g/mol and less than or equal to 5,000 g/mol, greater than or equal to 500 g/mol and less than or equal to 10,000 g/mol, or even greater than or equal to 500 g/mol and less than or equal to 5,000 g/mol, or any and all sub-ranges formed from any of these endpoints.

The dip-coat binder is included in the dip-coat binder solution in amounts such that the viscosity of the dip-coat binder solution is relatively low (e.g., greater than or equal to 1 cP and less than or equal to 150 cP) to enable uniform coating of the dip-coat binder solution on the green body part. Accordingly, in embodiments, the dip-coat binder solution comprises greater than or equal to 50 wt % and less than or equal to 89 wt % of the dip-coat binder, based on a total weight of the dip-coat binder solution. In embodiments, the dip-coat binder solution may comprise greater than 50 wt %, greater than or equal to 60 wt %, greater than or equal to 65 wt %, or even greater than or equal to 70 wt % of the dip-coat binder, based on a total weight of the dip-coat binder solution. In embodiments, the dip-coat binder solution may comprise less than or equal to 89 wt %, less than or equal to 85 wt %, less than or equal to 80 wt %, or even less than or equal to 75 wt % of the dip-coat binder, based on a total weight of the dip-coat binder solution. For example, the dip-coat binder solution may comprise greater than or equal to 50 wt % and less than or equal 89 wt %, greater than or equal to 50 wt % and less than or equal to 85 wt %, greater than or equal to 50 wt % and less than or equal to 80 wt %, greater than or equal to 50 wt % and less than or equal to 75 wt %, greater than or equal to 60 wt % and less than or equal 89 wt %, greater than or equal to 60 wt % and less than or equal to 85 wt %, greater than or equal to 60 wt % and less than or equal to 80 wt %, greater than or equal to 60 wt % and less than or equal to 75 wt %, greater than or equal to 65 wt % and less than or equal 89 wt %, greater than or equal to 65 wt % and less than or equal to 85 wt %, greater than or equal to 65 wt % and less than or equal to 80 wt %, greater than or equal to 65 wt % and less than or equal to 75 wt %, greater than or equal to 70 wt % and less than or equal 89 wt %, greater than or equal to 70 wt % and less than or equal to 85 wt %, greater than or equal to 70 wt % and less than or equal to 80 wt %, or even greater than or equal to 70 wt % and less than or equal to 75 wt %, or any and all sub-ranges formed from any of these endpoints of the dip-coat binder, based on a total weight of the dip-coat binder solution.

The dip-coat metallic precursor and the dip-coat binder are included in the dip-coat binder solution in amounts such that the viscosity of the dip-coat binder solution is relatively low to enable uniform coating of the dip-coat binder solution on the green body part. In embodiments, the weight ratio of the dip-coat metallic precursor to the dip-coat binder is greater than or equal to 1:4 and less than or equal to 1:1. For example, the weight ratio of the dip-coat metallic precursor to the dip-coat binder may be 1:4, 1:2, 3:5, 3:4, or 1:1.

The dip-coat binder solution may further include a solvent. The solvent may be aqueous or non-aqueous depending on the selected thermoplastic polymer and other additives, if any, included in the dip-coat binder solution. In embodiments in which the green body part is printed with a water-based print binder, the solvent may be non-aqueous. Green body parts printed with water-based print binders may dissolve if dipped in an aqueous dip-coat binder solution. In embodiments, the solvent is generally non-reactive (e.g., inert) such that it does not react with the dip-coat metallic precursor, the dip-coat binder, or any other additives that may be in the dip-coat binder solution. In embodiments, at least a portion of the solvent may readily evaporate after dipping of the green body part into the dip-coat binder solution and facilitate bonding of the dip-coat metallic precursor to itself and the green body part.

In embodiments, the solvent may be, by way of example and not limitation, water, 2-methoxy ethanol, butanol, 1-methoxy-2-propanol, 2-butoxy ethanol, ethylene glycol, ethylene glycol butyl ether, diethylene glycol, tetrahydrofuran (THF), methyl ethyl ketone (MEK), or combinations thereof. In embodiments, the solvent may be present in the dip-coat binder solution in an amount greater than or equal to 1 wt % and less than or equal to 50 wt %, greater than or equal to 1 wt % and less than or equal to 25 wt %, greater than or equal to 1 wt % and less than or equal to 10 wt %, greater than or equal to 10 wt % and less than or equal to 50 wt %, greater than or equal to 10 wt % and less than or equal to 25 wt %, or even greater than or equal to 25 wt % and less than or equal to 50 wt %, or any and all sub-ranges formed from any of these endpoints, based on a total weight of the dip-coat binder solution.

In embodiments, the viscosity of the dip-coat binder solution may be adjusted depending on the specific application of the dip-coat binder solution. A fluid with a relatively low viscosity (e.g., less than or equal to 150 cP) has a low resistance, shears easily, and flows quickly. A fluid with a relatively high viscosity (e.g., greater than 150 cP) moves sluggishly and resists deformation. Accordingly, the viscosity of the dip-coat binder solution should be sufficiently high (e.g., greater than or equal to 1 cP) to form a coating. However, the viscosity of the dip-coat binder solution should be kept relatively low (e.g., less than or equal to 150 cp) to enable uniform application of the dip-coat binder solution on the coated portion of the green body part. In embodiments, the dip-coat binder solution has a viscosity greater than or equal to 1 cP and less than or equal to 150 cP. In embodiments, the viscosity of the dip-coat binder solution may be greater than or equal to 1 cP, greater than or equal to 5 cP, greater than or equal to 10 cP, or even greater than or equal to 20 cP. In embodiments, the viscosity of the dip-coat binder solution may be less than or equal to 150 cP, less than or equal to 100 cP, less than or equal to 75 cP, or even less than or equal to 50 cP. For example, the viscosity of the dip-coat binder solution may be greater than or equal to 1 cP and less than or equal to 150 cP, greater than or equal to 1 cP and less than or equal to 100 cP, greater than or equal to 1 cP and less than or equal to 75 cP, greater than or equal to 1 cP and less than or equal to 50 cP, greater than or equal to 5 cP and less than or equal to 150 cP, greater than or equal to 5 cP and less than or equal to 100 cP, greater than or equal to 5 cP and less than or equal to 75 cP, greater than or equal to 5 cP and less than or equal to 50 cP, greater than or equal to 10 cP and less than or equal to 150 cP, greater than or equal to 10 cP and less than or equal to 100 cP, greater than or equal to 10 cP and less than or equal to 75 cP, greater than or equal to 10 cP and less than or equal to 50 cP, greater than or equal to 20 cP and less than or equal to 150 cP, greater than or equal to 20 cP and less than or equal to 100 cP, greater than or equal to 20 cP and less than or equal to 75 cP, or even greater than or equal to 1 cP and less than or equal to 50 cP, or any and all sub-ranges formed from any of these endpoints. In embodiments, the viscosity of the dip-coat binder solution may be dependent upon the dip-coat metallic precursor. For example, in embodiments, the dip-coat binder solution may include a salt (e.g., metallic salt) and the viscosity of the dip-coat binder solution may be greater than or equal to 1 cP and less than or equal to 150 cP. In embodiments, the dip-coat binder solution may include metallic nanoparticles and the viscosity of the dip-coat binder solution may be kept relatively low (e.g., less than or equal to 50 cP) to prevent agglomeration of the metallic nanoparticles. Agglomeration of the metallic nanoparticles may result in the metallic nanoparticles bonding to only an outermost surface of the green body part and not infiltrating the pores of the green body part.

In embodiments, the dip-coat binder solution may optionally include one or more additives to adjust the viscosity of the dip-coat binder solution or to otherwise enable uniform coating of the green body part. Optional additives include surfactants, diluents, viscosity or rheology modifiers, dispersants, stabilizers, or any other additive. In embodiments, the surfactants may be ionic (e.g., zwitterionic, cationic, anion) or non-ionic depending on the properties of the dip-coat binder and/or the metal dip-coat powder. In embodiments, the surfactant may comprise polypropoxy quaternary ammonium chloride (e.g., VARIQUAT™ CC 42 NS available from Evonik Industries), oligomers of hexanoic acid, alkylene oxide copolymer (e.g., HYPERMER™ KD2 available from Croda Advanced Materials), alkylene esters of fatty acids and alkylamines, 2-[4-(2,4,4-trimethylpentan-2-yl)phenoxy]ethanol (e.g., TRITON™ X-100 available from The Dow Chemical Company), polyoxyethylene (80) sorbitan monooleate (e.g., TWEEN™ 80 available from Croda Americas, Inc.), polyoxyethylene-23-lauryl ether (e.g., BRIJ™ L23 available from Croda Americas, Inc.), sodium dodecyl sulfate (SDS), hexadecyltrimethylammonium bromide (CTAB), dodecyltrimethylammonium bromide (DTAB), or a combination thereof.

In embodiments, the dip-coat binder solution may be prepared by adding a dip-coat metallic precursor, solvent, and optional additives to a dip-coat binder and stirring the dip-coat metallic precursor and dip-coat binder with, for example, a blender blade or magnetic stirrer. The dip-coat binder solution may be, for example, any one of the embodiments of the dip-coat binder solution described herein, comprising a dip-coat metallic precursor and a dip-coat binder. In embodiments, the particular dip-coat binder solution is selected based at least in part on the print powder used to form the layer of print powder. In embodiments, the dip-coat metallic precursor of the dip-coat binder solution and the print powder may comprise one or more of the same elements. For example, in embodiments in which the print powder comprises a metal print powder comprising a nickel alloy, a cobalt alloy, a cobalt-chromium alloy, a titanium alloy, an aluminum-based material, tungsten, stainless steel, or a combination thereof, the dip-coat metallic precursor may comprise a stainless steel alloy, a nickel alloy, a copper alloy, a copper-nickel alloy, a cobalt-chrome alloy, a titanium alloy, an aluminum alloy, a tungsten alloy, or a combination thereof. In embodiments in which the print powder is a metal print powder comprising nickel, the dip-coat metallic precursor may comprise nickel alloy.

Figure 2:
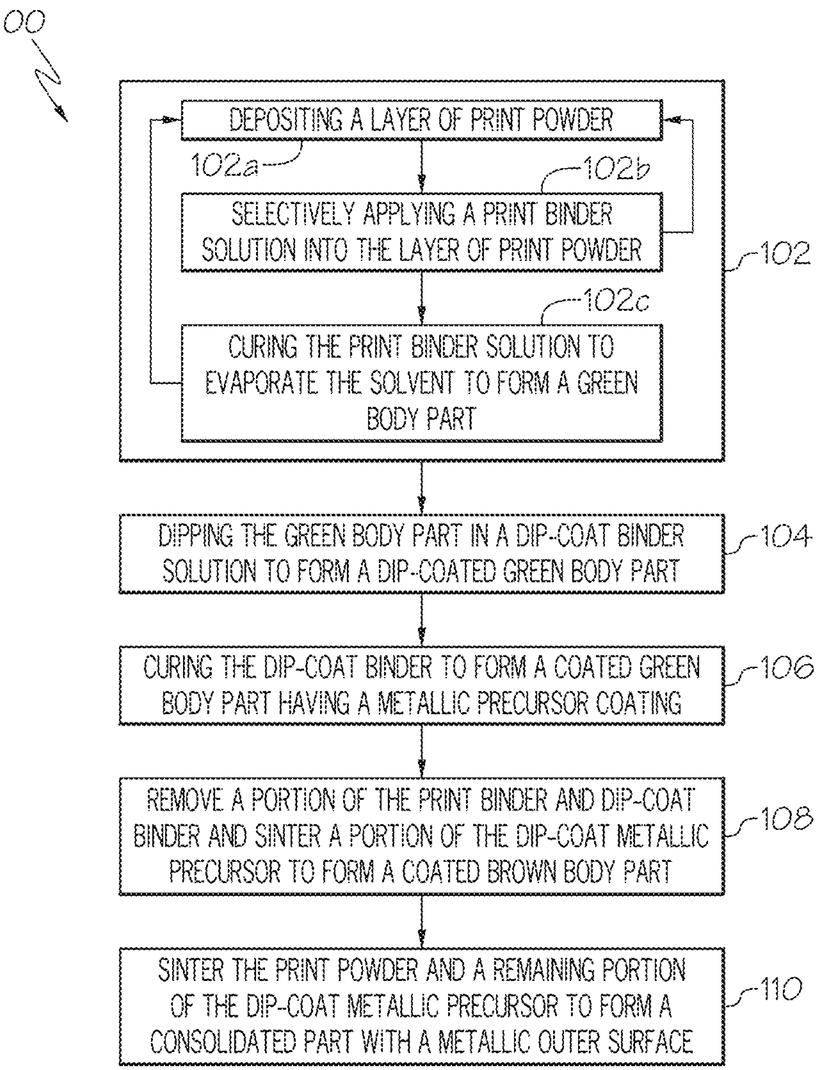
FIG. 2 is a flow diagram of an embodiment of a method of manufacturing a consolidated part using the dip-coat binder solution according to one or more embodiments described herein.

Referring now to FIG. 2, a method of manufacturing a consolidated part via additive manufacturing using the dip-coat binder solution according to embodiments described herein is shown at 100. To facilitate discussion of aspects of the method 100, reference is also made to FIG. 3, which is a block diagram depicting an embodiment of an additive manufacturing apparatus 120 that may be used to perform the method 100. The method 100 begins at block 102 with providing a green body part. The green body part may be provided by any method known to one of ordinary skill in the art.

Figure 4:
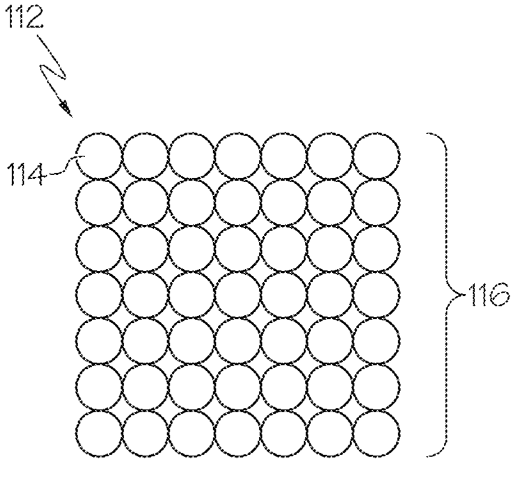
FIG. 4 is a schematic view of a layer of print powder from which a part is manufactured according to one or more embodiments shown and described herein.

For example, the step 102 of providing a green body part may begin at block 102*a* with depositing a layer 112 of a print powder 114 (e.g., creating a powder bed), as shown in FIG. 4, on a working surface. In embodiments, the layer 112 may have a thickness 116 greater than or equal to 10 microns (μm) and less than or equal to 200 μm. The print powder 114 used to print the part may vary depending on the type of part and the end use of the part.

In particular, the print powder 114 may include a metal print powder, such as a nickel alloy (e.g., Inconel 625, Inconel 718, Rene'108, Rene'80, Rene'142, Rene'195, and Rene'M2, Marm-247), a cobalt alloy (e.g., Hans 188, L605, X40, X45, and FSX414), a cobalt-chromium alloy, a titanium alloy, an aluminum-based alloy, a tungsten alloy, a stainless steel alloy, or a combination thereof. In embodiments, the metal print powder may comprise particles having a particle size distribution greater than or equal to 1 microns (μm) and less than or equal to 75 μm. Such print powders may be used to print metal articles including, by way of example and not limitation, fuel tips, fuel nozzles, shrouds, micro mixers, or turbine blades.

In embodiments, the print powder 114 may include a ceramic print powder, such as alumina, aluminum nitride, zirconia, titania, silica, silicon nitride, silicon carbide, boron nitride, or a combination thereof. In embodiments, the ceramic print powder may comprise particles having a particle size distribution greater than or equal to 0.1 μm and less than or equal to 100 μm. Such print powders may be used to print ceramic articles for use in, by way of example and not limitation, the medical and transportation industries.

Referring back to FIG. 2 at block 102*b*, following the deposition of print powder 114, the step 102 continues with selectively depositing a print binder solution into a portion of the layer 112 according to a pattern. For example, the print binder solution may be selectively printed into the layer 112 of print powder 114 using a print head that is operated by a controller based on a CAD design that includes a representation of a layer of the consolidated part being printed.

Figure 3:
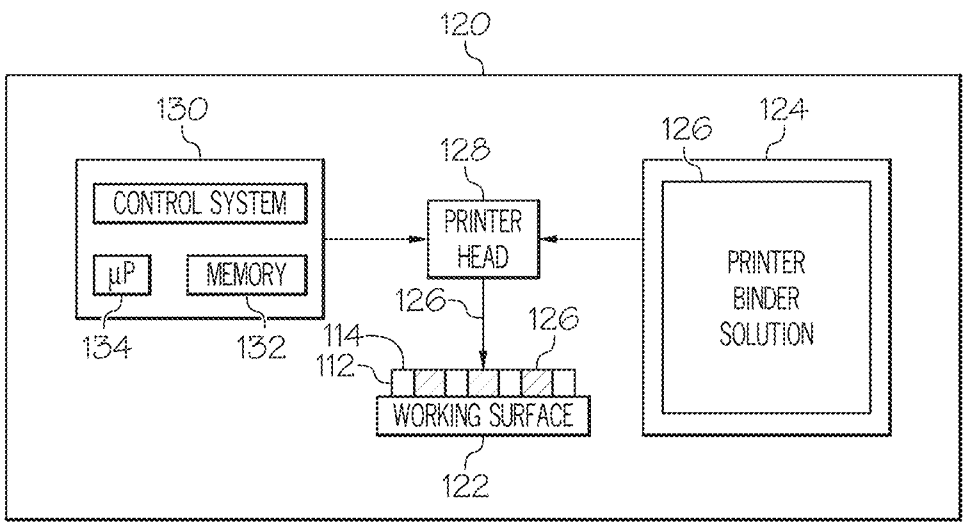
FIG. 3 is a block diagram of an additive manufacturing apparatus according to one or more embodiments shown and described herein.

For example, as shown in FIG. 3, the additive manufacturing apparatus 120 may be a binder jet printer that selectively deposits the print binder solution into the layer 112 according to the acts of block 102*b* (FIG. 2). In embodiments, the additive manufacturing apparatus 120 includes a working surface 122 that supports the layer 112 of print powder 114, a reservoir 124 that stores a print binder solution 126, and a printer head 128 that is fluidly coupled to the reservoir 124. The printer head 128 selectively deposits the print binder solution 126 into the layer 112 of print powder 114 to print the print binder solution 126 onto and into the layer 112 in a pattern that is representative of a layer of the consolidated part being printed. In embodiments, the additive manufacturing apparatus 120 includes a control system 130 for controlling operation of the additive manufacturing apparatus 120. The control system 130 may include a distributed control system (DCS) or any computer-based workstation that is fully or partially automated. In embodiments, the control system 130 may be any suitable device employing a general purpose computer or an application-specific device, which may generally include memory circuitry 132 storing one or more instructions for controlling operation of the additive manufacturing apparatus 120. The memory circuitry 132 may store CAD designs representative of a structure of the consolidated part being printed. The processor may include one or more processing devices (e.g., microprocessor 134), and the memory circuitry 132 may include one or more tangible, non-transitory, machine-readable media collectively storing instructions executable by the processer to control actions described herein.

After deposition, the print binder solution 126 at least partially coats an outer surface of the print powder 114, thereby generating binder-coated particles.

The step 102 may repeat the acts of blocks 102*a* and 102*b* to continue building up the part in a layer-by-layer manner until a desired number of layers 112 have been printed.

Figure 5:
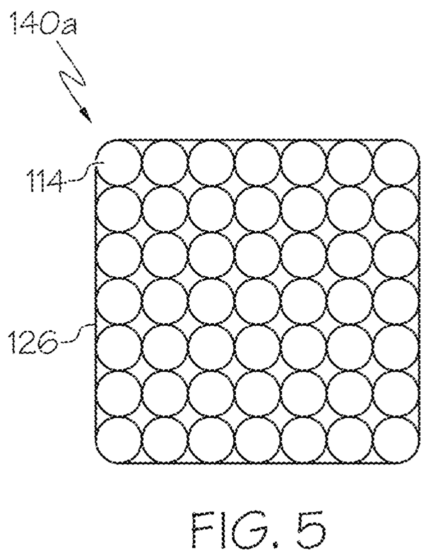
FIG. 5 is a schematic view of a green body part according to one or more embodiments shown and described herein.

As shown in FIG. 5, following deposition of the layer 112 and printing of the print binder solution 126 as set forth in blocks 102*a* and 102*b* of FIG. 2, the method 100 continues at block 102*c* with curing the print binder solution 126 to form a green body part 140*a*. For example, the print binder solution 126 may include a solvent. While a portion of the solvent in the print binder solution 126 may be evaporated during deposition (e.g., printing) of the print binder solution 126, a certain amount of the solvent may remain within the layer 112 of the print powder 114. Therefore, in embodiments, the print binder solution 126 may be thermally cured at a temperature that is suitable for evaporating the solvent remaining in the printed layer 112 and allowing efficient bonding of the printed layers 112, thereby forming the green body part 140*a*.

Heat may be applied to the printed part using an IR lamp and/or heated plate (e.g., on-machine), or may be carried out by placing the printed part in an oven (e.g., off-machine). In embodiments, curing the print binder solution 126 on-machine comprises heating the printed layers 112 at a temperature greater than or equal to 25° C. and less than or equal to 100° C., greater than or equal to 30° C. and less than or equal to 90° C., greater than or equal to 35° C. and less than or equal to 80° C., or even greater than or equal to 40° C. and less than or equal to 70° C., or any and all sub-ranges formed from any of these endpoints. In embodiments, temperature ranges for heating the printed layer 112 on-machine may differ from off-machine temperature ranges.

Unbound particles from the powder layer (e.g., the print powder 114 that is not bonded by the print binder solution 126) may be removed after curing to prepare the green body part 140*a* for post-printing steps, such as dipping, curing, debinding, and sintering.

After curing, the green body part 140*a* may undergo an optional drying step (not shown) to remove any residual solvent and/or other volatile materials that may remain in the green body part 140*a*. For example, the green body part 140*a* may be dried in a vacuum, under an inert atmosphere (e.g., nitrogen ($N_2$), or argon (Ar)) or in air at slightly elevated or room temperatures.

Although one particular embodiment of an additive manufacturing apparatus 120 has been described herein, it is contemplated that the dip-coat binder solutions described herein can be used in conjunction with other additive manufacturing devices. Accordingly, the embodiments described herein are not necessarily limited to the method of making a green body part described herein.

Figure 6:
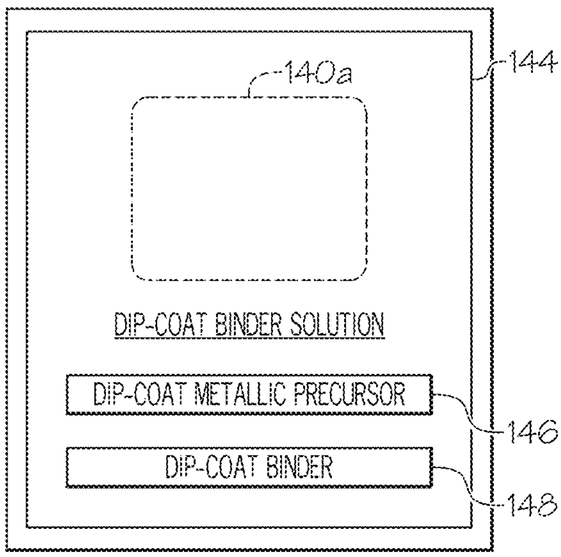
FIG. 6 is a schematic view of a green body part being dipped in a dip-coat binder solution according to one or more embodiments shown and described herein.

Following providing the green body part 140*a*, the method 100 continues at block 104 of FIG. 2 with dipping the green body part 140*a* in a dip-coat binder solution 144, as shown in FIG. 6. The green body part 140*a* may be dipped in or covered with the dip-coat binder solution 144 using any method known to one of ordinary skill in the art. For example, the green body part 140*a* may be placed in a net screen, dipped in the dip-coat binder solution 144, and lifted out of the dip-coat binder solution 144. In embodiments, the dip-coat binder solution 144 is uniformly mixed and/or stirred while the green body part 140*a* is dipped into the dip-coat binder solution 144 to ensure uniform coating of the dip-coat metallic precursor 146 and dip-coat binder 148 on the green body part 140*a*. In embodiments, a portion of the green body part 140*a* may be dipped into the dip-coat binder solution, while in other embodiments, the entire green body part 140*a* may be dipped into the dip-coat binder solution.

Figure 7:
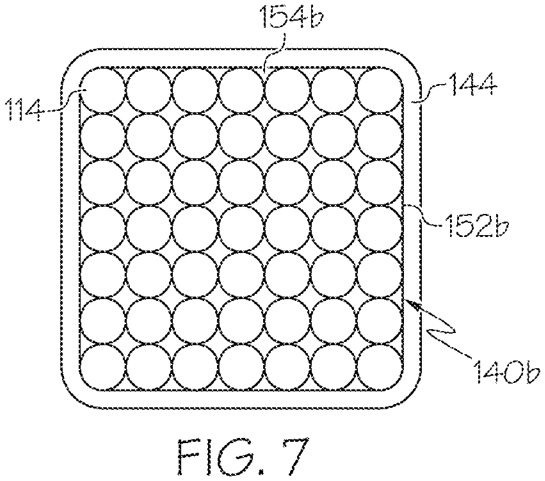
FIG. 7 is a schematic view of a dip-coated green body part according to one or more embodiments shown and described herein.

Referring now to FIG. 7, the dip-coat binder solution 144 at least partially coats an outer surface 152*b* of the green body part 140*a*, thereby forming a dip-coated green body part 140*b*. The area of the outer surface 152*b* of the green body part 140*a* depends, for example, on how much of the green body part 140*a* was dipped into the dip-coat binder solution in block 104. In embodiments, the dip-coat metallic precursor 146 of the dip-coat binder solution 144 infiltrates the pores 154*b* of the dip-coated green body part 140*b* and reduces the porosity of the dip-coated green body part 140*b* by filling the pores of the dip-coated green body part 140*b* with the dip-coat metallic precursor 146. The dip-coat binder 148 bonds the dip-coat metallic precursor 146 to itself and the dip-coated green body part 140*b*. The infiltration of the dip-coat metallic precursor 146 and the bonding provided by the dip-coat binder 148 also increases the density of, and provides strength to, the dip-coated green body part 140*b*.

In embodiments, the act of block 104 may be repeated to continue adding additional layers of the dip-coat binder solution 144 until a desired number of layers have been added.

Figure 8:
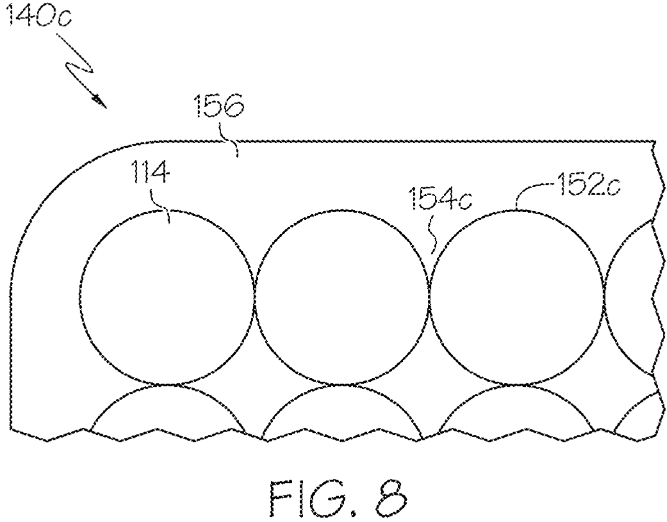
FIG. 8 is a schematic view of a coated green body part having a metallic precursor coating according to one or more embodiments shown and described herein.

The method 100 of FIG. 1 continues at block 106 with heating the dip-coated green body part 140*b* above a first temperature to cure the dip-coat binder solution 144 and form a coated green body part 140*c* having a metallic precursor coating 156 on an outer surface 152*c* of the coated green body part 140*c*, as shown in FIG. 8. During curing, the dip-coat binder solution 144 is transformed (e.g., by evaporation of the solvent) into the metallic precursor coating 156. The dip-coat metallic precursor of the metallic precursor coating 156, in the pores 154*c* of the coated green body part 140*c* and bonded to itself and the coated green body part 140*c* by the dip-coat binder of the metallic precursor coating 156, imparts a strength of greater than or equal to 10 MPa to the coated green body part 140*c*.

For example, as discussed hereinabove, in embodiments, the dip-coat binder solution 144 is a mixture of a dip-coat metallic precursor, a dip-coat binder, and a solvent. While a portion of the solvent in the dip-coat binder solution 144 may be evaporated during dipping of the green body part 140*a*, a certain amount of solvent may remain within the dip-coat binder solution 144 on the outer surface 152*b* of the dip-coated green body part 140*b*. Therefore, in embodiments, the dip-coat binder solution 144 may be thermally cured at a temperature that is suitable for evaporating the solvent remaining in the dip-coat binder solution 144 and allow efficient bonding of the dip-coat metallic precursor 146 to itself and the coated green body part 140*c*, thereby forming the metallic precursor coating 156.

In embodiments, heat is applied to the dip-coated green body part 140*b* using an IR lamp and/or heated plate (e.g., on-machine), or curing may be carried out by placing the printed part in an oven (e.g., off-machine). In embodiments, the first temperature is greater than or equal to 50° C. and less than or equal to 200° C., greater than or equal to 50° C. and less than or equal to 150° C., greater than or equal to 75° C. and less than or equal to 125° C., or even greater than or equal to 90° C. and less than or equal to 110° C. In embodiments, the dip-coated green body part 140*b* may be heated to the first temperature at a rate greater than or equal to 50° C./hr and less than or equal to 150° C. per hour. In embodiments, the dip-coated green body part **140*b*** may be held at the first temperature for a period greater than or equal to 0.1 hour and less than or equal to 1 hour.

In embodiments, heating the dip-coated green body part **140*b* above a first temperature may include heating the dip-coated green body part 140*b*** in an oxygen-free environment (e.g., in a vacuum chamber/inert atmosphere). In embodiments, heating may be performed under nitrogen ($N_2$), argon (Ar), another inert gas, under vacuum, or combinations thereof. In embodiments, the heating may be performed in air or in any other environment suitable for the specific materials being processed.

In embodiments, the thickness of the metallic precursor coating 156 on the coated green body part **140*c* may be adjusted based on the specific application of the final consolidated part. The thickness of the metallic precursor coating 156 on the coated green body part 140*c* should be sufficiently high (e.g., greater than or equal to 0.01 μm) to prevent phase separation or skinning effect between the metallic precursor coating 156 and the coated green body part 140*c*. However, the thickness of the metallic precursor coating 156 on the coated green body part 140*c* should be kept relatively low (e.g., less than or equal to 2 μm) so as not to significantly and/or negatively alter the profile of the underlying green body part 140*a*. In embodiments, the thickness of the metallic precursor coating 156 on the coated green body part 140*c* is greater than or equal to 0.01 μm and less than or equal to 0.5 μm. In embodiments, the thickness of the metallic precursor coating 154 on the coated green body part 140*c* may be greater than or equal to 0.01 μm, greater than or equal to 0.05 μm, or even greater than or equal to 0.1 μm. In embodiments, the thickness of the metallic precursor coating 156 on the coated green body part 140*c* may be less than or equal to 0.5 μm or even less than or equal to 0.25 μm. For example, the thickness of the metallic precursor coating 156 on the coated green body part 140*c*** may be greater than or equal to 0.01 μm and less than or equal to 0.5 μm, greater than or equal to 0.01 μm and less than or equal to 0.25 μm, greater than or equal to 0.05 μm and less than or equal to 0.5 μm, greater than or equal to 0.05 μm and less than or equal to 0.25 μm, greater than or equal to 0.1 μm and less than or equal to 0.5 μm, or even greater than or equal to 0.1 μm and less than or equal to 0.25 μm, or any and all sub-ranges formed from any of these endpoints.

In embodiments, the amount the metallic precursor coating 156 on the coated green body part **140*c* is, based on a total weight of the coated green body part 140*c*, greater than or equal to 0.5 wt % and less than or equal to 3 wt %, greater than or equal to 0.5 wt % and less than or equal to 2.5 wt %, greater than or equal to 0.5 wt % and less than or equal to 2 wt %, greater than or equal to 0.75 wt % and less than or equal to 3 wt %, greater than or equal to 0.75 wt % and less than or equal to 2.5 wt %, greater than or equal to 0.75 wt % and less than or equal to 2 wt %, greater than or equal to 1 wt % and less than or equal to 3 wt %, greater than or equal to 1 wt % and less than or equal to 2.5 wt %, or even greater than or equal to 1 wt % and less than or equal to 2 wt %, or any and all sub-ranges formed from any of these endpoints. In embodiments, the amount of the metallic precursor coating 156 varies depending on the amount of the green body part 140*a* dipped, the number of times the green body part 140*a*** is dipped, etc.

In embodiments, the metallic precursor coating 156 comprises greater than or equal to 10 wt % and less than or equal to 49 wt % of the dip-coat metallic precursor 146, based on a total weight of the metallic precursor coating 156. In embodiments, the amount of dip-coat metallic precursor 146 in the metallic precursor coating 156 may be greater than or equal to 10 wt %, greater than or equal to 20 wt %, greater than or equal to 30 wt %, or even greater than or equal to 35 wt %, based on a total weight of the metallic precursor coating 156. In embodiments, the amount of dip-coat metallic precursor 146 in the metallic precursor coating 156 may be less than or equal to 49 wt %, less than or equal to 47 wt %, or even less than or equal to 45 wt %, based on a total weight of the metallic precursor coating 156. For example, the amount of dip-coat metallic precursor 146 in the metallic precursor coating 156 may be greater than or equal to 10 wt % and less than or equal to 49 wt %, greater than or equal to 10 wt % and less than or equal to 47 wt %, greater than or equal to 10 wt % and less than or equal to 45 wt %, greater than or equal to 20 wt % and less than or equal to 49 wt %, greater than or equal to 20 wt % and less than or equal to 47 wt %, greater than or equal to 20 wt % and less than or equal to 45 wt %, greater than or equal to 30 wt % and less than or equal to 49 wt %, greater than or equal to 30 wt % and less than or equal to 47 wt %, greater than or equal to 30 wt % and less than or equal to 45 wt %, greater than or equal to 35 wt % and less than or equal to 49 wt %, greater than or equal to 35 wt % and less than or equal to 47 wt %, or even greater than or equal to 35 wt % and less than or equal to 45 wt %, or any and all sub-ranges formed from any of these endpoints, based on a total weight of the metallic precursor coating 156.

In embodiments, the metallic precursor coating 156 comprises greater than or equal to 50 wt % and less than or equal to 89 wt % of the dip-coat binder 148, based on a total weight of the metallic precursor coating 156. In embodiments, the metallic precursor coating 156 may comprise greater than 50 wt %, greater than or equal to 60 wt %, greater than or equal to 65 wt %, or even greater than or equal to 70 wt % of the dip-coat binder, based on a total weight of the metallic precursor coating 154. In embodiments, the metallic precursor coating 156 may comprise less than or equal to 89 wt %, less than or equal to 85 wt %, less than or equal to 80 wt %, or even less than or equal to 75 wt % of the dip-coat binder, based on a total weight of the metallic precursor coating 156. For example, the metallic precursor coating 156 may comprise greater than or equal to 50 wt % and less than or equal 89 wt %, greater than or equal to 50 wt % and less than or equal to 85 wt %, greater than or equal to 50 wt % and less than or equal to 80 wt %, greater than or equal to 50 wt % and less than or equal to 75 wt %, greater than or equal to 60 wt % and less than or equal 89 wt %, greater than or equal to 60 wt % and less than or equal to 85 wt %, greater than or equal to 60 wt % and less than or equal to 80 wt %, greater than or equal to 60 wt % and less than or equal to 75 wt %, greater than or equal to 65 wt % and less than or equal 89 wt %, greater than or equal to 65 wt % and less than or equal to 85 wt %, greater than or equal to 65 wt % and less than or equal to 80 wt %, greater than or equal to 65 wt % and less than or equal to 75 wt %, greater than or equal to 70 wt % and less than or equal 89 wt %, greater than or equal to 70 wt % and less than or equal to 85 wt %, greater than or equal to 70 wt % and less than or equal to 80 wt %, or even greater than or equal to 70 wt % and less than or equal to 75 wt %, or any and all sub-ranges formed from any of these endpoints of the dip-coat binder 148, based on a total weight of the metallic precursor coating 156.

In embodiments, the coated green body part **140*c* having the metallic precursor coating 156 has a strength greater than or equal to 10 MPa. In embodiments, the coated green body part 140***c* has a strength greater than or equal to 10 MPa, greater than or equal to 10.5 MPa, greater than or equal to 11 MPa, greater than or equal to 11.5 MPa, greater than or equal to 12 MPa, greater than or equal to 12.5 MPa, greater than or equal to 13 MPa, greater than or equal to 13.5 MPa, greater than or equal to 14 MPa, greater than or equal to 14 MPa, or even greater than or equal to 15 MPa.

In embodiments, the coated green body part 140*c* having the metallic precursor coating 156 has a density that is greater than 0%, greater than or equal to 0.5%, greater than or equal to 1%, greater than or equal to 1.5%, greater than or equal to 2%, greater than or equal to 2.5%, or even greater than or equal to 3% higher as compared to a green body part without the metallic precursor coating 156.

Figure 9:
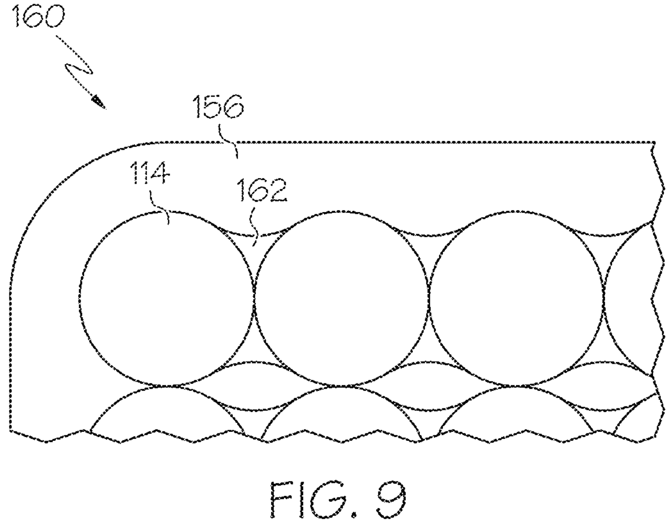
FIG. 9 is a schematic view of a coated brown body part having a metallic precursor coating according to one or more embodiments shown and described herein.

Following the formation of the metallic precursor coating 156, the method 100 of FIG. 2 continues at block 108 with heating the coated green body part 140*c* above a second temperature to remove at least a portion of the print binder and at least a portion of the dip-coat binder 148 (i.e., debinding) to form a coated brown body part 160. In embodiments, the decomposition temperature of the dip-coat metallic precursor is lower than the sintering temperature of the bulk print powder. As such, during debinding, at least a portion of the dip-coat metallic precursor of the metallic precursor coating 156 decomposes, promoting rapid, surface-based mass transfer between particles, forming interparticle necked regions of a metallic material 162. For example, as shown in FIG. 9, during the debinding step, the dip-coat metallic precursor of the metallic precursor coating 156 sinters to itself and forms a necked region of metallic material 162 between adjacent particles of the print powder 114. The necked region of the metallic material 162 bridges the print powder 114, thereby increasing the brown strength, BS, of the coated brown body part 160 after the print binder is burned out but prior to consolidation (i.e., sintering) of the print powder 114.

In embodiments, the second temperature is greater than or equal to 75° C. and less than or equal to 700° C., greater than or equal to 100° C. and less than or equal to 600° C., greater than or equal to 125° C. and less than or equal to 500° C., or even greater than or equal to 150° C. and less than or equal to 400° C., or any and all sub-ranges formed from any of these endpoints.

In embodiments, heating the coated green body part 140*c* above a second temperature may include heating the coated green body part 140*c* in an oxygen-free environment (e.g., in a vacuum chamber/inert atmosphere). In embodiments, debinding may be performed under nitrogen ($N_2$), argon (Ar), another inert gas, under vacuum, or combinations thereof. In embodiments, the debinding may be performed in air or in any other environment suitable for the specific materials being processed.

In embodiments, the coated brown body part 160 may comprise a strength greater than or equal to 3 MPa, greater than or equal to 3.5 MPa, greater than or equal to 4 MPa, greater than or equal to 4.5 MPa, greater than or equal to 5 MPa, greater than or equal to 5.5 MPa, or even greater than or equal to 6 MPa.

Figure 10:
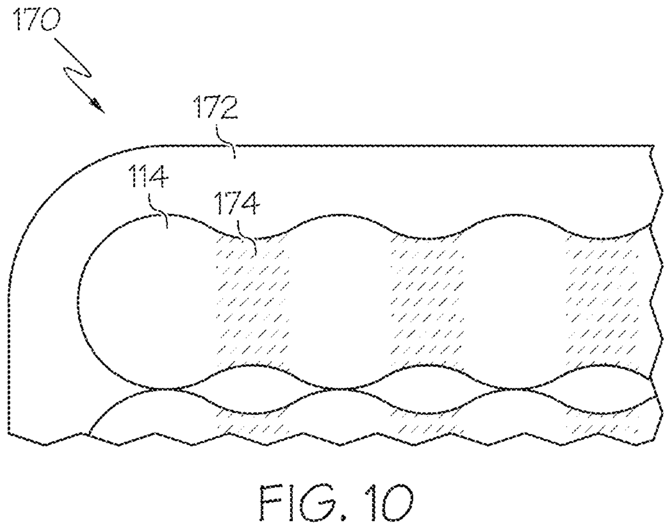
FIG. 10 is a schematic view of a consolidated part having a metallic outer surface according to one or more embodiments shown and described herein.

The method 100 illustrated in FIG. 2 concludes at block 110 with heating the coated brown body part 160 above a third temperature to sinter the print powder 114 and a remaining portion of the dip-coat metallic precursor 146 and the print powder 114 (i.e., sintering), thereby forming a consolidated part 170. During the sintering step, a remaining portion of the dip-coat metallic precursor 146 sinters to itself and the print powder 114, thereby forming a metallic outer surface 172. The print powder 114 sinters with the dip-coat metallic precursor 146 and the metallic material 162, thereby forming a particulate phase 174, as shown in FIG. 10.

In embodiments, the third temperature is greater than or equal to 75° C. and less than or equal to 1500° C., greater than or equal to 75° C. and less than or equal to 1450° C., greater than or equal to 75° C. and less than or equal to 1400° C., greater than or equal to 100° C. and less than or equal to 1500° C., greater than or equal to 100° C. and less than or equal to 1450° C., greater than or equal to 100° C. and less than or equal to 1400° C., greater than or equal to 200° C. and less than or equal to 1500° C., greater than or equal to 200° C. and less than or equal to 1450° C., greater than or equal to 200° C. and less than or equal to 1400° C., greater than or equal to 300° C. and less than or equal to 1500° C., greater than or equal to 300° C. and less than or equal to 1450° C., greater than or equal to 300° C. and less than or equal to 1400° C., greater than or equal to 400° C. and less than or equal to 1500° C., greater than or equal to 400° C. and less than or equal to 1450° C., or even greater than or equal to 400° C. and less than or equal to 1400° C., or any and all sub-ranges formed from any of these endpoints.

In embodiments, heating the coated brown body part 160 above a third temperature may include heating the coated brown body part 160 in an oxygen-free environment (e.g., in a vacuum chamber under inert atmosphere). In embodiments, heating may be performed under nitrogen ($N_2$), argon (Ar), another inert gas, under vacuum, or combinations thereof. In embodiments, the heating may be performed in air or in any other environment suitable for the specific materials being processed.

In embodiments, the debinding of block 108 and the sintering of block 110 of method 100 illustrated in FIG. 2 occur in a single step.

Although various embodiments described herein are described with reference to method 100, it should be understood that embodiments of the dip-coat binder solution described herein can be used with a variety of methods that are known and used by those skilled in the art. In particular, forming a green body part, dipping, and heating may be accomplished in a number of different ways, in a number of different steps, and in a number of different locations.

Further aspects of the invention are provided by the subject matter of the following clauses:

1. A dip-coat binder solution comprising: greater than or equal to 10 wt % to less than or equal to 49 wt % of a dip-coat metallic precursor, based on a total weight of the dip-coat binder solution; and a dip-coat binder, wherein the dip-coat binder solution has a viscosity greater than or equal to 1 cP and less than or equal to 150 cP.

2. The dip-coat binder solution of any preceding clause, wherein the dip-coat binder solution comprises greater than or equal to 20 wt % and less than or equal to 47 wt % of the dip-coat metallic precursor, based on a total weight of the dip-coat binder solution.

3. The dip-coat binder solution of any preceding clause, wherein the dip-coat metallic precursor is selected from the group consisting of an alkaline earth metal, a transition metal, a post-transition metal, a metalloid, a rare earth metal, and combinations thereof.

4. The dip-coat binder solution of any preceding clause, wherein the dip-coat metallic precursor comprises an organometallic compound, the organometallic compound comprising ferrocene, cobaltocene, iron pentacarbonyl, metal acetylacetonate, a cyclopentadienyl complex, a metal alkyl, a metal aryl, or a combination thereof.

5. The dip-coat binder solution of any preceding clause, wherein the dip-coat metallic precursor comprises a salt, the salt comprising a compound selected from the group consisting of carboxylates, nitrates, sulfates, carbonates, formates, chlorides, halides, a derivative thereof, and combinations thereof.

6. The dip-coat binder solution of any preceding clause, wherein the salt comprises nickel chloride, nickel carbonate, nickel formate, nickel nitrate, iron chloride, copper chloride, copper nitrate, silver nitrate, aluminium nitrate, magnesium chloride, barium nitrate, barium chloride, titanium nitrate, or a combination thereof.

7. The dip-coat binder solution of any preceding clause, wherein the dip-coat metallic precursor comprises metallic nanoparticles.

8. The dip-coat binder solution of any preceding clause, wherein the metallic nanoparticles comprise nickel, silver, chromium, aluminum, cobalt, iron, copper, gold or a combination thereof.

9. The dip-coat binder solution of any preceding clause, wherein the dip-coat metallic precursor has an incipient melting temperature greater than or equal to 300° C. and less than or equal to 600° C.

10. The dip-coat binder solution of any preceding clause, wherein the dip-coat binder solution has a viscosity greater than or equal to 10 cP to less than or equal to 100 cP.

11. The dip-coat binder solution of any preceding clause, wherein the first polymer strand has an average molecular weight greater than or equal to 7,000 g/mol and less than or equal to 50,000 g/mol.

12. The dip-coat binder solution of any preceding clause, wherein the first polymer strand is selected from the group consisting of polystyrene (PS), polyvinyl pyrrolidone (PVP), polycarbonate, derivatives thereof, and combinations thereof 13. A coated green body part comprising: a plurality of layers of print powder; and a metallic precursor coating on an outer surface of the plurality of layers of print powder, the metallic precursor coating comprising: greater than or equal to 10 wt % and less than or equal to 49 wt % of a dip-coat metallic precursor, based on a total weight of the metallic precursor coating; and a dip-coat binder, wherein the coated green body part comprises a strength greater than or equal to 10 MPa.

14. The coated green body part of any preceding clause, wherein the dip-coat metallic precursor comprises an organometallic compound, the organometallic compound comprising ferrocene, cobaltocene, iron pentacarbonyl, metal acetylacetonate, a cyclopentadienyl complex, a metal alkyl, a metal aryl, or a combination thereof.

15. The coated green body part of any preceding clause, wherein the dip-coat metallic precursor comprises a salt selected from the group consisting of carboxylates, nitrates, sulfates, carbonates, formats, chlorides, halides, derivatives thereof, and combinations thereof.

16. The coated green body part of any preceding clause, wherein the dip-coat metallic precursor comprises metallic nanoparticles, the metallic nanoparticles comprising nickel, silver, chromium, aluminum, cobalt, iron, copper, gold or a combination thereof.

17. The coated green body part of any preceding clause, wherein the dip-coat metallic precursor has an incipient melting temperature greater than or equal to 300° C. and less than or equal to 600° C.

18. The coated green body part of any preceding clause, wherein the print powder comprises a metal print powder, the metal print powder comprising a nickel alloy, a cobalt alloy, a cobalt-chromium alloy, a titanium alloy, a cast alloy, an aluminium-based material, tungsten, stainless steel, or a combination thereof.

19. The coated green body part of any preceding clause, wherein the print powder comprises a ceramic print powder, the ceramic print powder comprising alumina, silicon nitride, boron nitride, or a combination thereof.

20. A method of forming a part, the method comprising: providing a green body part comprising a plurality of layers of print powder and a print binder; dipping the green body part in a dip-coat binder solution, the dip-coat binder solution comprising: greater than or equal to 10 wt % and less than or equal to 49 wt % of a dip-coat metallic precursor, based on a total weight of the dip-coat binder solution; and a dip-coat binder; and heating the dip-coated green body part.

21. The method of any preceding clause, wherein heating the dip-coated green body part comprises heating the dip-coated green body part above a first temperature greater than or equal to 50° C. and less than or equal to 200° C. to form a coated green body part having a metallic precursor coating on an outer surface of the coated green body part.

22. The method of any preceding clause, wherein the coated green body part has a strength greater than or equal to 10 MPa.

23. The method of any preceding clause, wherein the method further comprises heating the coated green body part above a second temperature greater than or equal to 100° C. and less than or equal to 600° C. to remove at least a portion of the print binder and at least a portion the dip-coat binder to form a coated brown body part having the metallic precursor coating on an outer surface of the coated body part.

24. The method of any preceding clause, wherein the method further comprises heating the coated brown body part above a third temperature greater than or equal to 1000° C. and less than or equal to 1400° C. to sinter the dip-coat metallic precursor and the print powder to form a consolidated part with a metallic outer surface.

25. The method of any preceding clause, wherein the dip-coat binder solution has a viscosity greater than or equal to 1 cP and less than or equal to 150 cP.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A method of forming a part, the method comprising:

providing a green body part comprising a plurality of layers of print powder and a print binder;

dipping the green body part in a dip-coat binder solution to form a dip-coated green body part, the dip-coat binder solution comprising:

greater than or equal to 10 wt % and less than or equal to 49 wt % of a dip-coat metallic precursor, based on a total weight of the dip-coat binder solution; and greater than 50 wt % of a thermoplastic polymer, the thermoplastic polymer comprising one or more thermoplastic polymer strands; and heating the dip-coated green body part.

2. The method of claim 1, wherein, the dip-coat binder solution further comprises greater than or equal to 1 wt. % of a solvent.

3. The method of claim 1, wherein heating the dip-coated green body part comprises heating the dip-coated green body part above a first temperature greater than or equal to 50° C. and less than or equal to 200° C. to form a coated green body part having a metallic precursor coating on an outer surface of the coated green body part.

4. The method of claim 3, wherein a thickness of the metallic precursor coating on the coated green body part is less than or equal to 2 μm.

5. The method of claim 4, wherein the thickness of the metallic precursor coating on the coated green body part is greater than or equal to 0.01 μm and less than or equal to 0.5 μm.

6. The method of claim 3, wherein the coated green body part has a strength greater than or equal to 10 MPa.

7. The method of claim 3, wherein heating the dip-coated green body part above the first temperature includes heating the dip-coated green body part in an oxygen-free environment.

8. The method of claim 3, wherein the method further comprises heating the coated green body part above a second temperature greater than or equal to 100° C. and less than or equal to 600° C. to remove at least a portion of the print binder and at least a portion of the dip-coat binder solution to form a coated brown body part having the metallic precursor coating on an outer surface of the dip-coated green body part.

9. The method of claim 8, wherein the method further comprises heating the coated brown body part above a third temperature greater than or equal to 1000° C. and less than or equal to 1400° C. to sinter the dip-coat metallic precursor and the plurality of layers of print powder to form a consolidated part with a metallic outer surface.

10. The method of claim 1, wherein the dip-coat binder solution has a viscosity greater than or equal to 1 cP and less than or equal to 150 cP, wherein the viscosity is measured using a rheometer in accordance with ASTM E3116.

11. The method of claim 1, wherein the thermoplastic polymer has a first polymer strand, wherein the first polymer strand has an average molecular weight greater than or equal to 7,000 g/mol and less than or equal to 50,000 g/mol.

12. The method of claim 1, wherein providing the green body part comprising the plurality of layers of print powder further comprises depositing each layer with a thickness greater than or equal to 10 μm and less than or equal to 200 μm.

13. The method of claim 1, wherein providing the green body part further comprises selectively depositing the print binder according to a pattern to partially coat an outer surface of the plurality of layers of print powder.

14. The method of claim 1, wherein providing the green body part further comprises curing the plurality of layers of print powder and the print binder under a heat source to form the green body part prior to dipping the green body part in the dip-coat binder solution.

15. The method of claim 1, wherein dipping the green body part in a dip-coat binder solution further comprises iteratively dipping a portion of the green body part into the dip-coat binder solution.

* * * * *